Patented Oct. 12, 1954

2,691,575

UNITED STATES PATENT OFFICE 2,691,575

CONVERTING LEAD OXIDE TO LEAD

Lester L. Larson, Mendenhall, Pa., assignor to E. I. du Pont de Nemours & Company, Wilmington, Del., a corporation of Delaware No Drawing. Application September 6, 1951, Serial No. 245,420

8 Claims. (Cl. 75—77)

This invention relates to a process for converting lead oxide to lead and particularly to the treatment of lead oxide slag materials obtained in the refining of impure by-product lead produced in the manufacture of tetraethyl lead.

It is well known that tetraalkyl lead compounds may be prepared by the reaction of an alkyl chloride with a lead-sodium alloy. Such process has been employed commercially for many years in the manufacture of tetraethyl lead by the reaction of an excess of ethyl chloride with lead-monosodium alloy, PbNa. After the reaction is completed, the excess ethyl chloride is distilled from the reaction mass, the reaction mass is drowned in water and the tetraethyl lead is removed therefrom by steam distillation. During such process, the sodium of the alloy is mostly converted to sodium chloride, about 25% of the lead in the alloy is converted to tetraethyl lead, and the remainder of the lead is converted to metallic lead in finely divided form suspended in the dilute solution of sodium chloride. Such suspension is then conveyed to a sludge pit where it is allowed to settle to form an upper layer of an aqueous solution of salt and a lower layer of aqueous sludge which comprises the lead mixed with about 8% to about 20% by weight of the aqueous solution of the salt. The water layer is drawn off and the aqueous sludge is washed with water to remove most of the salt and then dried to remove most of the water.

The resulting dried by-product lead has been refined by melting in a reverberatory furnace at from about 700° C. to about 900° C. and separating the molten lead from the slag. Such slag consists mainly of lead oxide mixed with minor proportions of lead, lead salts and sodium chloride. Heretofore, such slag has been shipped to another plant for reclamation of its lead content, usually by treatment with iron oxide, calcium carbonate and coke in a blast furnace. Such procedure is inconvenient and expensive.

The lead, that is employed in the manufacture of the lead-sodium alloy, is substantially pure and contains no significant amounts of tin, antimony, arsenic or zinc, the specifications requiring less than 0.02% of antimony and arsenic, combined. Therefore, the by-product lead, obtained in the manufacture of tetraethyl lead, is substantially free of such metals, less than 0.0265% by weight of antimony and arsenic combined. However, the by-product lead contains lead chloride and, in some cases, other lead salts, such as lead sulfate, lead sulfide and lead chromate, in a proportion of less than 1% by weight, usually very much less. The impure by-product lead will frequently contain from about 2% to about 20% by weight of sodium chloride and less than 1% by weight of each of sodium sulfate and sodium carbonate. Also, the lead in the reaction mass is finely divided, the particles having an average diameter of less than 0.1 inch, and is very readily oxidized. Therefore, the surfaces of the particles of the lead become oxidized and thereby coated with lead oxide during the subsequent processing steps, such as drowning of the reaction mixture, steam distillation of the tetraethyl lead therefrom, washing, drying, etc. In practice, the lead oxide will usually be present in an amount of from about 2% to about 10% by weight of the by-product lead, frequently as high as about 20% and, in extreme cases, as high as about 30%. By operating under conditions involving a minimum contact with air and other forms of free oxygen, it is possible to keep the amount of lead oxide down to 0.1% to 0.2% by weight.

Mortimer C. Denison, in his application Serial No. 236,267, filed July 11, 1951, discloses a novel process for melting and refining such impure by-product lead. Briefly, such process comprises mixing the by-product lead with at least 2% by weight of sodium hydroxide, heating the mixture at a temperature of from 327° C. to about 450° C. until the particles of by-product lead melt and coalesce, settling the molten mixture to form a lower layer of molten metallic lead and an upper layer of molten sodium hydroxide containing the lead oxide, and then separating the layers. Preferably, the amount of sodium hydroxide is sufficient to form a distinct continuous layer of molten caustic on the upper surface of the molten metallic lead. The nonvolatile impurities in the by-product lead, i. e., the lead oxide, the other lead compounds and the sodium salts accumulate in the molten caustic layer, the sodium chloride and part of the lead compounds being dissolved in the sodium hydroxide and part of the lead compounds being suspended in such solution. Such nonvolatile impurities, accumulated in the sodium hydroxide, are similar in composition to the lead oxide slag produced in the reverberatory furnace and hence are included in the term "lead oxide slag material" obtained in the refining of impure by-product lead produced in the manufacture of tetraethyl lead. The viscosity of the molten caustic layer increases with increase in the proportions of such impurities dissolved and suspended therein. Increase in the concentration of sodium chloride in the caustic layer to materially more than 20% by weight tends to make the molten caustic objectionably viscous and difficult to handle. Similarly, increase in the concentration of lead oxide and other lead compounds, dissolved and suspended in the caustic layer, to materially more than 50% by weight tends to render the caustic layer objectionably viscous and difficult to handle.

It is an object of my invention to provide a novel method of converting lead oxide to lead. More particularly, it is an object to convert to lead the lead oxide obtained in the refining of the impure by-product lead produced in the manufacture of tetraethyl lead, and especially the lead oxide accumulated in the caustic layer obtained in the process of Denison. A further object is to provide a simple, convenient and economical method for converting lead oxide to lead. Another object is to advance the art. Still other objects will appear hereinafter.

The above and other objects may be accomplished in accordance with my invention which comprises heating a fluid mixture consisting essentially of lead oxide and from about 50% to about 200% by weight of sodium hydroxide based on the lead oxide at a temperature of from 327° C. to about 450° C., mixing with such mixture from about 10% to about 30% by weight of metallic sodium based on the lead oxide, and separating molten lead from the reaction mixture. By such process, the lead oxide is converted to lead which accumulates as a body of molten metal below the molten caustic and which contains a small proportion of metallic sodium, but is otherwise substantially pure metallic lead. Such body of molten lead can be readily separated from the molten sodium hydroxide which floats thereon and carries with it sodium oxide and other non-volatile materials. The lead, so obtained, is especially valuable and adapted for manufacture into lead-monosodium alloy, PbNa, for use in the manufacture of tetraethyl lead.

The lead oxide, which is to be treated in accordance with my invention, may be substantially pure and from any source. However, my process is particularly adapted to the treatment of the lead oxide slag materials that are obtained in the refining of impure by-product lead produced in the manufacture of tetraethyl lead, such as that obtained by melting the by-product lead in a reverberatory furnace and that present in admixture with sodium hydroxide as obtained by the treatment of impure by-product lead with molten sodium hydroxide. The lead oxide slag materials will frequently contain substantial amounts of sodium chloride and small amounts of other impurities originally present in the impure by-product lead. The amount of sodium chloride will depend upon the extent to which it has been removed from the impure by-product lead by washing and may be absent.

The sodium hydroxide, in my process, acts mainly as a solvent and suspension medium. The proportion of sodium hydroxide should be sufficient to produce a fluid mixture which can be readily agitated. Usually, the sodium hydroxide is employed in a proportion of from about 50% to about 200% by weight based on the lead oxide. While materially larger proportions of sodium hydroxide may be employed, the use thereof is unnecessary and uneconomical, and requires longer times of treatment.

When lead oxide slag from the reverberatory furnace and substantially pure lead oxide from other sources are employed, they will be mixed with the molten sodium hydroxide at the temperature of treatment. When lead oxide slag is obtained by treating impure by-product lead with molten sodium hydroxide, as by the process of Denison, the mixture will be at the temperature required for treatment and usually will contain sodium hydroxide in the proportions required for my process, and hence it will usually be unnecessary to add further amounts of sodium hydroxide thereto.

Theoretically, the proportion of metallic sodium required to convert the lead oxide to lead, is about 20% by weight based on the lead oxide. However, the proportion of metallic sodium, added to the mixture of lead oxide and sodium hydroxide, may be from about 10% to about 30% and, preferably, from about 20% to about 30% by weight based on the lead oxide. The proportion of metallic sodium employed in any particular case will depend upon the results desired and the procedure employed.

When metallic sodium is added to the mixture of lead oxide and sodium hydroxide with gentle stirring in the process of my invention, the major proportion of the sodium reacts with the lead oxide and converts it to lead. A minor proportion of the metallic sodium dissolves in the lead that is formed and does not react with the lead oxide. The proportion of the metallic sodium, dissolved in the lead, depends upon the amount of metallic sodium that is added to the mixture at one time, the proportion of dissolved sodium increasing with increase in the size of the addition. Thus, if about 50% of the theoretical amount of the metallic sodium is added all at once, only a very small proportion thereof dissolves in the lead and almost all of it reacts with the lead oxide. If a larger addition of metallic sodium is employed, a larger proportion of the sodium dissolves in the lead, a larger proportion of the lead oxide is converted to lead, the reaction is more rapid, and more heat is evolved.

Thus, when it is desired to convert most of the lead oxide to lead with maximum utilization of the metallic sodium in the reaction, it is preferred to add the metallic sodium in increments, i. e., in a series of small portions, preferably spaced so that each portion is substantially completely reacted before another portion is added and also, preferably, with removal of the lead formed before the next addition. The addition of the metallic sodium in increments also has the advantage of facilitating control of the temperature and of the reaction. However, as the concentration of the lead oxide in the mixture is decreased by conversion to lead, it is desirable to increase the proportion of metallic sodium to lead oxide, added in the succeeding increments, to an excess of that theoretically required, so as to obtain more rapid reaction.

In order to complete the reaction in the minimum period of time, all of the metallic sodium will be added to the mixture of lead oxide and sodium hydroxide in one lot or at a rapid rate. Such procedure renders control of the temperature more difficult because of the more rapid evolution of heat. It also requires the addition of larger proportions of metallic sodium to convert a given proportion of the lead oxide to lead, due to the solution of larger proportions of unreacted sodium in the lead. However, the use of such larger proportions of metallic sodium does not constitute a disadvantage since most of the excess, over that consumed in the reaction, is recovered in the lead and such lead is valuable for the manufacture of lead-monosodium alloy.

According to one desirable manner of carrying out my process, the proportion of metallic sodium employed is about equal to that theoretically required to convert the lead oxide to lead plus that theoretically required to form lead-monosodium alloy with the lead obtained, i. e., a total of about 30% by weight of metallic sodium based on the lead oxide. Some of the sodium will be retained by the sodium hydroxide and hence the lead will usually contain somewhat less sodium than that required to form the lead-monosodium alloy. Such lead is advantageously separated from the sodium hydroxide and treated with additional sodium in another vessel where the composition of the alloy and the conditions can be more accurately controlled.

My process is particularly well adapted and designed for the treatment of the mixtures of lead oxide slag materials and sodium hydroxide obtained in the sodium hydroxide process for refining impure by-product lead produced in the manufacture of tetraethyl lead, disclosed by Denison in application Serial No. 236,267. In one desirable embodiment, my process will be employed in conjunction with such sodium hydroxide refining process to rejuvenate the sodium hydroxide whenever it tends to become objectionably viscous due to accumulation of lead oxide and other lead salts therein. In such sodium hydroxide refining process, the impure by-product lead preferably contains little or no sodium chloride whereby the caustic layer tends to become objectionably viscous principally or solely due to the accumulation therein of lead oxide and other lead salts. It is desirable to then interrupt the addition of the by-product lead and to add metallic sodium to the caustic layer to convert about 50% or more of the lead oxide to lead which sinks into the layer of molten lead. Thereby, the sodium hydroxide layer is rejuvenated and its viscosity is reduced so that the addition and refining of impure by-product lead can be resumed. Such rejuvenation procedure can be repeated periodically until the caustic layer becomes objectionably viscous and non-fluid due to the accumulation of sodium compounds which do not melt under the conditions employed. In such rejuvenation procedure, it will generally be most convenient to convert only from about 50% to about 80% of the lead oxide to lead each time, the lead oxide being more completely converted by a subsequent treatment of the separated caustic layer, if desired.

My process must be carried out with the mixture of lead oxide and sodium hydroxide at a temperature of at least 327° C., the melting point of lead, and preferably at a temperature of from about 350° C. to about 450° C. Under these conditions, the process can be carried out conveniently in vessels made of ordinary cast iron or mild steel. While the process can be carried out at materially higher temperatures, no particular advantage will be obtained thereby. Also, ordinary cast iron and mild steel suffer from creep and scaling at such higher temperatures, so that the use of such higher temperatures makes it necessary to employ vessels made of more expensive materials of construction.

In order to more clearly illustrate my invention, suitable modes of carrying the same into effect and the advantageous results to be obtained thereby, the following examples are given:

*Example 1*

Dried by-product lead, obtained in the manufacture of tetraethyl lead, consisted essentially of lead, lead oxide, sodium chloride, moisture, less than 1% of each $PbCl_2$, $PbSO_4$, $PbS$, $PbCrO_4$, $Na_2SO_4$ and $Na_2CO_3$, and less than 0.03% of antimony and arsenic combined. About 7786 grams of such by-product lead was heated at about 400° C. with about 782 grams of molten sodium hydroxide according to the method of Denison in Serial No. 236,267. After separating the molten lead formed, there remained a residue composed of 782 grams of sodium hydroxide and 1047 grams of residual slag materials, consisting of 932 grams of the lead compounds (principally PbO) and 215 grams of the other nonvolatile inorganic materials (principally sodium chloride).

This residue (including the sodium hydroxide) was heated in a cast iron pot with 110 grams of metallic sodium at 350–450° C. for 2 hours with gentle stirring. 495.0 grams of metallic lead separated and was removed from the bottom of the pot. It contained 0.12% or 0.6 grams of unchanged metallic sodium. The 494.4 grams of metallic lead thus formed corresponds closely with that which would theoretically be formed (492.5 grams) by the 109.4 grams of metallic sodium consumed. The latter was 57% of that required to reduce all of the combined lead present, assuming it all to be in the form of PbO.

*Example 2*

The residue from Example 1, containing (by calculation) about 400 grams of PbO, 782 grams of sodium hydroxide, and the sodium oxide formed from the metallic sodium, was treated with 97 grams of additional metallic sodium, a 17% excess over that calculated to react with the lead oxide remaining. After 3 hours at about 400° C., an alloy, composed of 302.5 grams of lead (81% of that calculated to be present) and 11.5 grams of unchanged sodium, separated. The sodium content of the alloy was therefore 3.66%. Further treatment of the remaining residue with 25 grams of metallic sodium gave an additional 66.5 grams of lead. Analysis of the final residue at the end showed it to contain only 6 grams of lead. The formation of the 863.4 grams of lead, in this and the preceding Example 1, theoretically required approximately 191.5 grams of sodium.

It will be understood that the preceding examples have been given for illustrative purposes solely and that my invention is not limited to the specific embodiments disclosed therein. It will be apparent to those skilled in the art that many variations can be made in the proportions of materials, the conditions and the techniques employed within the limitations hereinbefore set forth and in accordance with the principles disclosed and the results desired, without departing from the spirit or scope of my invention.

From the preceding description, it will be apparent that my invention provides a simple, convenient and economical method for converting lead oxide to lead and particularly for so converting the lead oxide in the slag materials obtained in the refining of impure by-product lead produced in the manufacture of tetraethyl lead. By my process, the inconvenience, expense and hazards of the previously employed blast furnace process have been eliminated. Also, the lead obtained is peculiarly adapted for re-use in the manufacture of lead-sodium alloy to be employed in the manufacture of tetraethyl lead. Accordingly, it will be apparent that my invention constitutes a valuable contribution to and advance in the art.

I claim:

1. The process which comprises heating a fluid mixture consisting essentially of lead oxide and from about 50% to about 200% by weight of sodium hydroxide based on the lead oxide at a temperature of from 327° C. to about 450° C., mixing with such mixture from about 10% to about 30% by weight of metallic sodium based on the lead oxide, and separating molten lead from the reaction mixture.

2. The process which comprises heating a fluid mixture consisting essentially of lead oxide and from about 50% to about 200% by weight of sodium hydroxide based on the lead oxide at a temperature of from 327° C. to about 450° C., mixing with such mixture from about 20% to about 30% by weight of metallic sodium based on the lead oxide, and separating molten lead from the reaction mixture.

3. The process which comprises heating a fluid mixture consisting essentially of lead oxide and from about 50% to about 200% by weight of sodium hydroxide based on the lead oxide at a temperature of from 327° C. to about 450° C., mixing with such mixture from about 10% to about 30% by weight of metallic sodium based on the lead oxide, the sodium being gradually added to the mixture in increments, and separating molten lead from the reaction mixture.

4. The process which comprises heating a fluid mixture consisting essentially of lead oxide and from about 50% to about 200% by weight of sodium hydroxide based on the lead oxide at a temperature of from 327° C. to about 450° C., mixing with such mixture from about 20% to about 30% by weight of metallic sodium based on the lead oxide, the sodium being gradually added to the mixture in increments, and separating molten lead from the reaction mixture.

5. The process for treating lead oxide slag material obtained in the refining of impure by-product lead produced in the manufacture of tetraethyl lead, which comprises heating a fluid mixture consisting essentially of said lead oxide slag material and from about 50% to about 200% by weight of sodium hydroxide based on the lead oxide at a temperature of from 327° C. to about 450° C., mixing with such mixture from about 10% to about 30% by weight of metallic sodium based on the lead oxide, and separating molten lead from the reaction mixture.

6. The process for treating lead oxide slag material obtained from impure by-product lead produced in the manufacture of tetraethyl lead by refining such by-product lead with molten sodium hydroxide, which comprises heating a fluid mixture consisting essentially of said lead oxide slag material and from about 50% to about 200% by weight of sodium hydroxide based on the lead oxide at a temperature of from 327° C. to about 450° C., mixing with such mixture from about 10% to about 30% by weight of metallic sodium based on the lead oxide, and separating molten lead from the reaction mixture.

7. The process for treating lead oxide slag material obtained from impure by-product lead produced in the manufacture of tetraethyl lead by refining such by-product lead with molten sodium hydroxide, which comprises heating a fluid mixture consisting essentially of said lead oxide slag material and from about 50% to about 200% by weight of sodium hydroxide based on the lead oxide at a temperature of from 327° C. to about 450° C., mixing with such mixture about 12% by weight of metallic sodium based on the lead oxide, separating molten lead from the reaction mixture, then mixing with the reaction mixture from about 24% to about 30% by weight of metallic sodium based on the lead oxide remaining in the reaction mixture, and separating further amounts of molten lead from such reaction mixture.

8. In combination with the process for refining impure by-product lead produced in the manufacture of tetraethyl lead wherein such by-product lead is treated with molten sodium hydroxide which forms a fluid caustic layer consisting essentially of lead oxide and from about 50% to about 200% by weight of sodium hydroxide based on the lead oxide, the improvement which comprises interrupting such process and mixing with such caustic layer from about 10% to about 30% by weight of metallic sodium based on the lead oxide in such caustic layer at a temperature of from 327° C. to about 450° C., and separating molten lead from such caustic layer.

References Cited in the file of this patent

UNITED STATES PATENTS

| Number | Name | Date |
|---|---|---|
| 1,827,754 | Kirsebom | Oct. 20, 1931 |
| 2,110,446 | Leferrer | Mar. 8, 1938 |
| 2,365,177 | Dittmer | Dec. 19, 1944 |

OTHER REFERENCES

"Thorpe's Dictionary of Applied Chemistry," 4th ed., vol. X, paragraph (VI), pp. 810, 811, 1950.